US012601518B2

(12) United States Patent
Brown et al.

(10) Patent No.: US 12,601,518 B2
(45) Date of Patent: Apr. 14, 2026

(54) SMART BUILDING LEVEL CONTROL FOR IMPROVING COMPLIANCE OF TEMPERATURE, PRESSURE, AND HUMIDITY

(71) Applicant: Tyco Fire & Security GmbH, Neuhausen am Rheinfall (CH)

(72) Inventors: Julie J. Brown, Yardley, PA (US); Mervyn Tremayne Drieberg, Apopka, FL (US); Alden R. Winters, Seven Valleys, PA (US); Renee R. Jacobs, Leawood, KS (US); Fawn R. Staerkel, Phoenix, AZ (US); Rachel D.M. Ellerman, Shorewood, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 85 days.

(21) Appl. No.: 18/219,205

(22) Filed: Jul. 7, 2023

(65) Prior Publication Data
US 2023/0349580 A1 Nov. 2, 2023

Related U.S. Application Data

(63) Continuation of application No. 17/024,376, filed on Sep. 17, 2020, now Pat. No. 11,698,205.
(Continued)

(51) Int. Cl.
*F24F 11/64* (2018.01)
*F24F 11/30* (2018.01)
(Continued)

(52) U.S. Cl.
CPC .............. *F24F 11/64* (2018.01); *F24F 11/30* (2018.01); *F24F 11/32* (2018.01); *F24F 11/38* (2018.01);
(Continued)

(58) Field of Classification Search
CPC .......... F24F 11/64; F24F 11/523; F24F 11/38; F24F 11/58; F24F 11/30; G05B 19/042;
(Continued)

(56) References Cited

U.S. PATENT DOCUMENTS

| | | | |
|---|---|---|---|
| 5,545,086 A * | 8/1996 | Sharp | F24F 11/0001 |
| | | | 454/238 |
| 6,711,470 B1 | 3/2004 | Hartenstein et al. | |

(Continued)

FOREIGN PATENT DOCUMENTS

| | | |
|---|---|---|
| CA | 2957726 A1 | 3/2016 |
| CA | 3043996 A1 | 2/2018 |

(Continued)

OTHER PUBLICATIONS

EP Office Action for EP Appl. Ser. No. 20781707.3 dated Dec. 11, 2024 (5 pages).
(Continued)

*Primary Examiner* — Mohammad Ali
*Assistant Examiner* — Vincent W Chang
(74) *Attorney, Agent, or Firm* — Foley & Lardner LLP

(57) ABSTRACT

A building management system for monitoring and controlling HVAC parameters in a building includes one or more processing circuits configured to initialize a predictive model for predicting temperature, pressure, and humidity within a target area and an adjacent area of the building, receive target area data from a target area sensor array configured to measure temperature, pressure, and humidity of the target area, receive adjacent area data from an adjacent area sensor array configured to measure temperature, pressure, and humidity of the adjacent area, execute the predictive model based on the target area data and the adjacent area data to generate a prediction of future temperature, pressure, and humidity within the target area, and control operation of
(Continued)

HVAC equipment to maintain the temperature, pressure, and humidity of the target area within a compliance standard.

14 Claims, 9 Drawing Sheets

Related U.S. Application Data

(60) Provisional application No. 62/902,338, filed on Sep. 18, 2019.

(51) Int. Cl.

| | |
|---|---|
| *F24F 11/32* | (2018.01) |
| *F24F 11/38* | (2018.01) |
| *F24F 11/523* | (2018.01) |
| *F24F 11/58* | (2018.01) |
| *G05B 19/042* | (2006.01) |
| *G06N 5/02* | (2023.01) |
| *G06Q 10/0631* | (2023.01) |
| *G06Q 10/0639* | (2023.01) |
| *G06Q 10/20* | (2023.01) |
| *G06Q 30/018* | (2023.01) |
| *G06Q 50/163* | (2024.01) |
| *F24F 110/10* | (2018.01) |
| *F24F 110/20* | (2018.01) |
| *F24F 110/40* | (2018.01) |

(52) U.S. Cl.
CPC ............ *F24F 11/523* (2018.01); *F24F 11/58* (2018.01); *G05B 19/042* (2013.01); *G06N 5/02* (2013.01); *G06Q 10/0631* (2013.01); *G06Q 10/06395* (2013.01); *G06Q 10/20* (2013.01); *G06Q 30/018* (2013.01); *G06Q 50/163* (2013.01); *F24F 2110/10* (2018.01); *F24F 2110/20* (2018.01); *F24F 2110/40* (2018.01); *G05B 2219/25011* (2013.01); *G05B 2219/2614* (2013.01)

(58) Field of Classification Search
CPC ... G06Q 10/0631; G06Q 10/163; G06Q 10/20
See application file for complete search history.

(56) References Cited

U.S. PATENT DOCUMENTS

| | | | |
|---|---|---|---|
| 6,968,294 | B2 | 11/2005 | Gutta et al. |
| 7,069,333 | B1 | 6/2006 | Morris et al. |
| 8,600,561 | B1 | 12/2013 | Modi et al. |
| 8,727,981 | B2 | 5/2014 | Bechtel et al. |
| 9,105,071 | B2 | 8/2015 | Fletcher et al. |
| 9,189,750 | B1 | 11/2015 | Narsky |
| 9,447,985 | B2 | 9/2016 | Johnson |
| 9,644,857 | B1 | 5/2017 | Ashgriz et al. |
| 9,817,383 | B1 | 11/2017 | Sinha et al. |
| 10,037,821 | B2 | 7/2018 | Johnson et al. |
| 10,871,756 | B2 | 12/2020 | Johnson et al. |
| 10,908,578 | B2 | 2/2021 | Johnson et al. |
| 10,921,768 | B2 | 2/2021 | Johnson et al. |
| 11,156,978 | B2 | 10/2021 | Johnson et al. |
| 2002/0138327 | A1 | 9/2002 | Mello et al. |
| 2004/0111313 | A1 | 6/2004 | Ingman |
| 2004/0260594 | A1 | 12/2004 | Maddox, Jr. |
| 2007/0225849 | A1 | 9/2007 | Norbeck |
| 2008/0033674 | A1 | 2/2008 | Nikovski et al. |
| 2009/0150022 | A1 | 6/2009 | McMillin et al. |
| 2010/0107070 | A1 | 4/2010 | Devineni et al. |
| 2010/0114385 | A1 | 5/2010 | Dempster et al. |
| 2010/0286937 | A1 | 11/2010 | Hedley et al. |
| 2011/0088000 | A1 | 4/2011 | Mackay |
| 2011/0112854 | A1 | 5/2011 | Koch et al. |
| 2011/0178977 | A1 | 7/2011 | Drees |

| | | | |
|---|---|---|---|
| 2011/0279861 | A1 | 11/2011 | Scheller |
| 2011/0298629 | A1 | 12/2011 | Wilson |
| 2012/0125559 | A1 | 5/2012 | Fadell et al. |
| 2012/0185728 | A1 | 7/2012 | Guo et al. |
| 2013/0231792 | A1 | 9/2013 | Ji et al. |
| 2014/0052644 | A1 | 2/2014 | Ott |
| 2014/0074730 | A1 | 3/2014 | Arensmeier et al. |
| 2014/0095182 | A1 | 4/2014 | Fletcher et al. |
| 2014/0156085 | A1 | 6/2014 | Modi et al. |
| 2014/0172479 | A1 | 6/2014 | Gallagher et al. |
| 2014/0297229 | A1 | 10/2014 | Izumo et al. |
| 2015/0041550 | A1 | 2/2015 | Honda |
| 2015/0056909 | A1 | 2/2015 | Chien |
| 2015/0178865 | A1 | 6/2015 | Anderson et al. |
| 2015/0261229 | A1 | 9/2015 | Roy |
| 2015/0269641 | A1 | 9/2015 | Roy |
| 2015/0332007 | A1 | 11/2015 | Rosebraugh |
| 2016/0054018 | A1 | 2/2016 | Motodani et al. |
| 2016/0066068 | A1* | 3/2016 | Schultz .................. F24F 11/523 340/870.07 |
| 2016/0117646 | A1 | 4/2016 | Lerick et al. |
| 2016/0203036 | A1 | 7/2016 | Mezic et al. |
| 2016/0216721 | A1 | 7/2016 | Michalski et al. |
| 2016/0247168 | A1 | 8/2016 | Pappalardo |
| 2016/0313752 | A1 | 10/2016 | Przybylski |
| 2016/0335731 | A1 | 11/2016 | Hall |
| 2017/0011318 | A1 | 1/2017 | Vigano et al. |
| 2017/0038945 | A1 | 2/2017 | Beaulieu et al. |
| 2017/0364870 | A1 | 12/2017 | Merg et al. |
| 2018/0087970 | A1 | 3/2018 | Schechter et al. |
| 2018/0100663 | A1 | 4/2018 | Crimins et al. |
| 2018/0107990 | A1 | 4/2018 | Beadles |
| 2018/0195752 | A1 | 7/2018 | Sasaki et al. |
| 2018/0299840 | A1 | 10/2018 | Sinha et al. |
| 2018/0365621 | A1 | 12/2018 | Merg et al. |
| 2019/0025809 | A1 | 1/2019 | Bhattacharya et al. |
| 2019/0041882 | A1 | 2/2019 | Noboa et al. |
| 2019/0156298 | A1 | 5/2019 | Ethington et al. |
| 2019/0170603 | A1 | 6/2019 | Gupte et al. |
| 2019/0186766 | A1 | 6/2019 | Maslekar et al. |
| 2019/0346417 | A1 | 11/2019 | Benefield |
| 2019/0360716 | A1 | 11/2019 | Ozaki |
| 2019/0385025 | A1 | 12/2019 | Mcmichael et al. |
| 2020/0041161 | A1 | 2/2020 | Sanyo |
| 2020/0132327 | A1 | 4/2020 | Samuni et al. |
| 2020/0227159 | A1 | 7/2020 | Boisvert et al. |
| 2020/0240662 | A1 | 7/2020 | Picardi et al. |
| 2020/0348038 | A1 | 11/2020 | Risbeck et al. |
| 2020/0377197 | A1 | 12/2020 | Ramaswamy et al. |
| 2020/0387802 | A1 | 12/2020 | Wandall |
| 2020/0393181 | A1 | 12/2020 | Yang et al. |
| 2021/0003308 | A1 | 1/2021 | Venne |
| 2021/0010693 | A1 | 1/2021 | Gamroth et al. |
| 2021/0010701 | A1 | 1/2021 | Nesler et al. |
| 2021/0011443 | A1 | 1/2021 | Mcnamara et al. |
| 2021/0011444 | A1 | 1/2021 | Risbeck et al. |
| 2021/0025809 | A1 | 1/2021 | Munn et al. |
| 2021/0193309 | A1 | 6/2021 | Boisvert et al. |
| 2021/0373519 | A1 | 12/2021 | Risbeck et al. |
| 2021/0381861 | A1 | 12/2021 | Brown et al. |
| 2021/0390804 | A1 | 12/2021 | Rajamanickam et al. |
| 2021/0390807 | A1 | 12/2021 | Chaurasia et al. |
| 2021/0390812 | A1 | 12/2021 | Chaurasia et al. |
| 2021/0391089 | A1 | 12/2021 | Eswara et al. |
| 2021/0394112 | A1 | 12/2021 | Isobe et al. |
| 2021/0398659 | A1 | 12/2021 | Sharma et al. |
| 2021/0398690 | A1 | 12/2021 | Gibson et al. |
| 2021/0398691 | A1 | 12/2021 | Dhamija et al. |
| 2022/0060856 | A1 | 2/2022 | Wellig et al. |
| 2022/0102007 | A1 | 3/2022 | Palanivel et al. |
| 2022/0203287 | A1 | 6/2022 | Wenger et al. |
| 2022/0203288 | A1 | 6/2022 | Wenger et al. |
| 2022/0205962 | A1 | 6/2022 | Vanderkoy |
| 2022/0207215 | A1 | 6/2022 | Liu et al. |
| 2022/0254483 | A1 | 8/2022 | Boisvert et al. |
| 2022/0277851 | A1 | 9/2022 | Wellig |
| 2022/0282886 | A1 | 9/2022 | Hriljac et al. |
| 2022/0305438 | A1 | 9/2022 | Wenger et al. |

(56) References Cited

U.S. PATENT DOCUMENTS

| 2022/0305881 A1 | 9/2022 | Neu et al. |
| 2022/0373209 A1 | 11/2022 | Ko et al. |
| 2022/0404056 A1 | 12/2022 | Bloemer et al. |

FOREIGN PATENT DOCUMENTS

| CN | 103250114 A | 8/2013 |
| CN | 104697130 A | 6/2015 |
| CN | 107431649 A | 12/2017 |
| CN | 109099561 A | 12/2018 |
| CN | 109144214 A | 1/2019 |
| CN | 112639633 A | 4/2021 |
| EP | 3 186 687 A4 | 7/2017 |
| EP | 3 497 377 A1 | 6/2019 |
| WO | WO-2021/258116 A1 | 12/2021 |

OTHER PUBLICATIONS

Mirakhorli et al., "Occupancy behavior based model predictive control for building indoor climate—A critical review," Energy and buildings, Aug. 9, 2016, vol. 129 (pp. 499-513).

Oldewurtel et al., "Energy Efficient Building Climate Control using Stochastic Model Predictive Control and Weather Predictions," American Control Conference, June 30-Jul. 2, 2010 (6 pages).

Parisio et al., "A scenario-based predictive control approach to building HVAC management systems," 2013 IEEE International Conference on Automation Science and Engineering (CASE), IEEE, Aug. 17, 2013 (pp. 428-435).

CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).

International Search Report and Written Opinion on PCT Appl. Ser. No. PCT/US2020/051302 dated Mar. 5, 2021 (28 pages).

Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).

Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).

Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).

Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).

Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).

Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).

Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).

Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).

Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).

Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).

Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).

Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).

Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).

Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).

Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).

Johnson Solid State LLC, "Building Automation Gui," URL: http://cooljohnson.com/Video/Building_Automation/Confidential_Customer_BLD_2/Building_Automation_GUI.mp4, retrieved from internet Oct. 27, 2022 (24 pages).

Johnson Solid State LLC, "Cooling Logic Overview," URL: http://coolinglogic.com/documents/CoolingLogic_Overview_High_Quality.mp4, retrieved from internet Oct. 27, 2022 (16 pages).

Johnson Solid State LLC, "So what is CoolingLogic™?" URL: http://coolinglogic.com/Coolinglogic-How-it-Works.html, retrieved from the internet Oct. 27, 2022 (3 pages).

Johnson, David, "A Method to Increase HVAC System Efficiency and Decrease Energy Consumption," White Paper: Johnson Solid State, LLC, URL: http://coolinglogic.com/documents/16102106_White_Paper_High_Resolution_Protected.pdf, Sep. 24, 2016 (51 pages).

Johnson, David, "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).

Johnson, David, "Excel Rehabilitation Building Automation: Building Automation System User Manual ," URL: http://cooljohnson.

(56)    References Cited

OTHER PUBLICATIONS com/Building-Automation-Systems-Michigan/Waterford-Michigan/ Building-Automation-System-Excel-Manual.html, 2012 (10 pages).

Johnson, David, "Temperature Control System and Methods for Operating Same," Pre-Publication printout of U.S. Appl. No. 15/231,943, filed Aug. 9, 2016, URL: http://coolinglogic.com/documents/ 16080901_CIP_As_Filed.pdf (99 pages).

Kelly et al., "Detecting Faults in Building Air Handling Units—A Background Study for Developing Intelligent Agents for Optimizing Building HVAC Systems" (https://nvlpubs.nist.gov/nistpubs/ TechnicalNotes/N IST.TN .1831.pdf) 2014, (40 pages).

Mei et al., "Model predictive control for optimizing indoor air temperature and humidity in a direct expansion air conditioning system," The 27th Chinese Control and Decision Conference, Qingdao, 2015, pp. 2491-2496.

Mirakhorli et al., "Occupancy behavior based model predictive control for building indoor climate—A critical review," Energy and Buildings, vol. 129, 2016, pp. 499-513.

Oldewurtel et al., "Energy Efficient Building Climate Control using Stochastic Model Predictive Control and Weather Predictions," 2010 American Control Conference, Baltimore, MD, USA, Jun. 30-Jul. 2, 2010, pp. 5100-5105.

Parisio et al., "A scenario-based predictive control approach to building HVAC management systems," 2013 IEEE International Conference on Automation Science and Engineering (CASE), Madison, WI, USA, 2013, pp. 428-435.

Park Assist, "A comforting stress-free experience: For patients and visitors alike," https://www.parkassist.com/who-we-serve/ healthcare/, retrieved from the internet May 12, 2022, (3 pages).

Park Assist, "Park Finder" https://www.parkassist.com/solutions-2/ inx/inx-standard/park-finder/, retrieved from the internet May 12, 2022, (3 pages).

Pointr, "Indoor Navigation Guide visitors with personalized AR indoor navigation via Bluetooth beacons," https://www.pointr.tech/ solutions/location-based-services/indoor-navigation, retrieved from the internet May 12, 2022, (13 pages).

Pointr, "Smart Hospital Solutions, Analytics & Software," https:// www.pointr.tech/smart-hospital, retrieved from the internet May 12, 2022, (25 pages).

Tagnos, "Operational Intelligence: Patient, Staff & Equipment Dashboards," https://www.tagnos.com/tagnos-platform/operational-intelligence/, retrieved from the internet May 12, 2022, (3 pages).

CN Office Action for CN Appl. Ser. No. 202080079521.4 dated Mar. 29, 2025 (36 pages).

SG Written Opinion for SG Appl. Ser. No. 11202202473V dated Jun. 3, 2025 (6 pages).

CN Office Action for CN Appl. Ser. No. 202080079521.4 dated Sep. 24, 2025 (27 pages).

CN Office Action for Appl. Ser. No. CN 202080079521.4 dated Feb. 11, 2026 (41 pages).

* cited by examiner

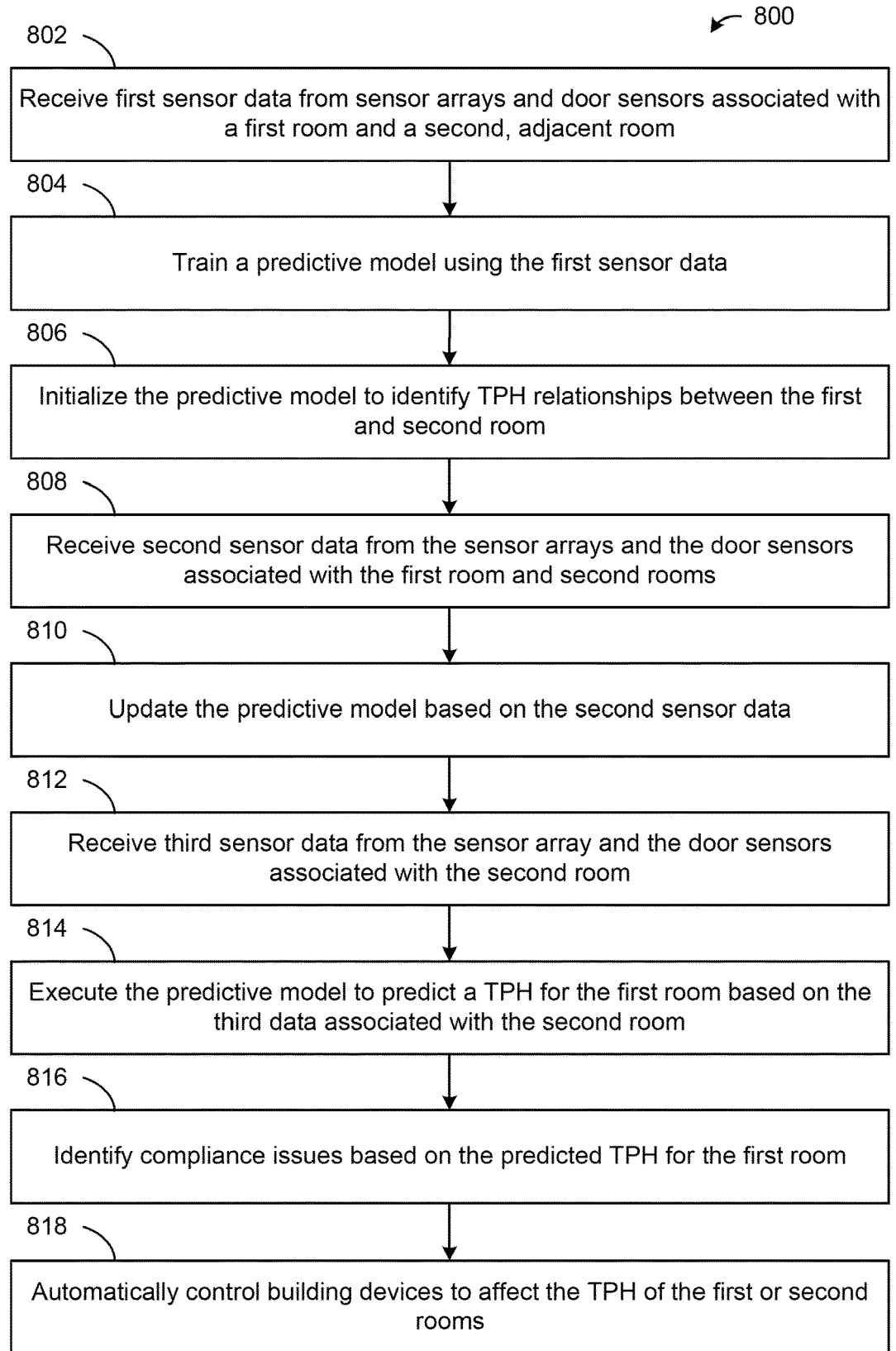

802

Receive first sensor data from sensor arrays and door sensors associated with a first room and a second, adjacent room

804

Train a predictive model using the first sensor data

806

Initialize the predictive model to identify TPH relationships between the first and second room

808

Receive second sensor data from the sensor arrays and the door sensors associated with the first room and second rooms

810

Update the predictive model based on the second sensor data

812

Receive third sensor data from the sensor array and the door sensors associated with the second room

814

Execute the predictive model to predict a TPH for the first room based on the third data associated with the second room

816

Identify compliance issues based on the predicted TPH for the first room

818

Automatically control building devices to affect the TPH of the first or second rooms

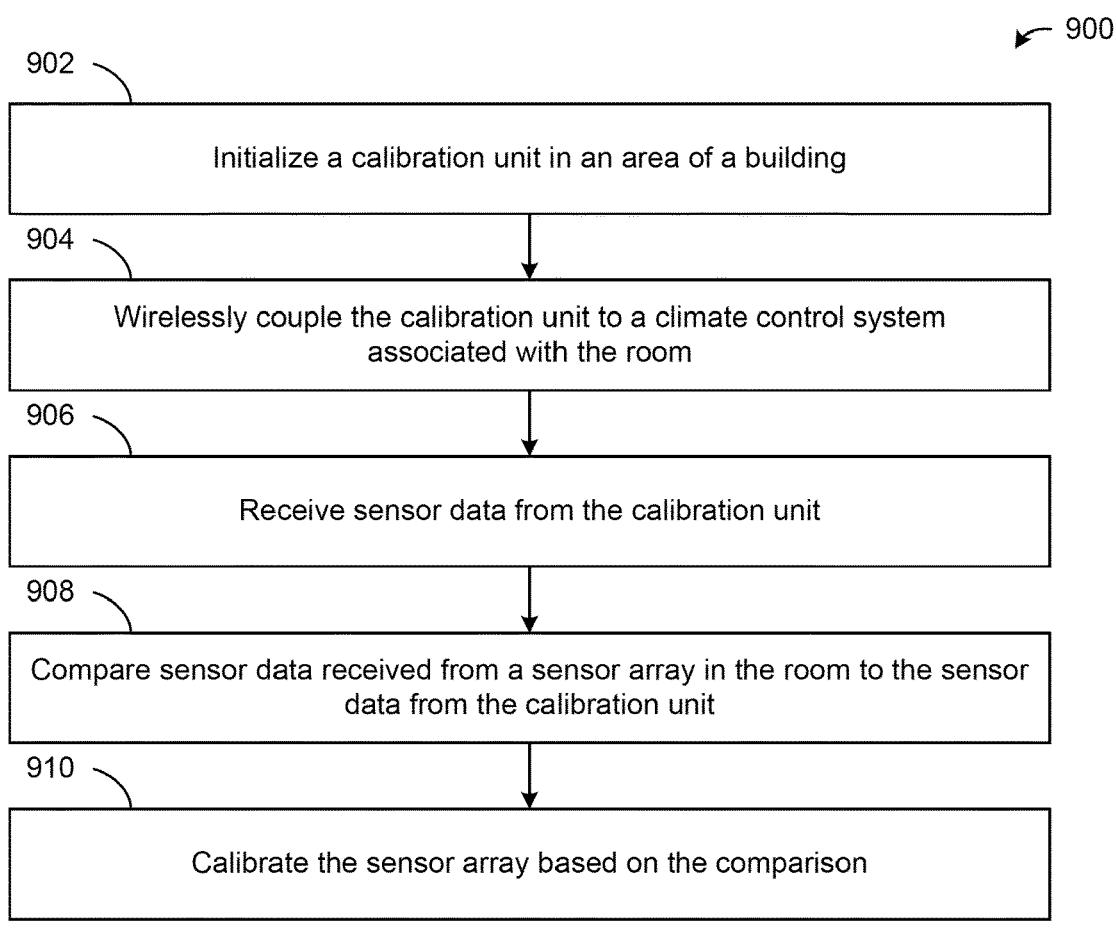

900

902
Initialize a calibration unit in an area of a building

904
Wirelessly couple the calibration unit to a climate control system associated with the room 906
Receive sensor data from the calibration unit 908
Compare sensor data received from a sensor array in the room to the sensor data from the calibration unit 910
Calibrate the sensor array based on the comparison

FIG. 9A

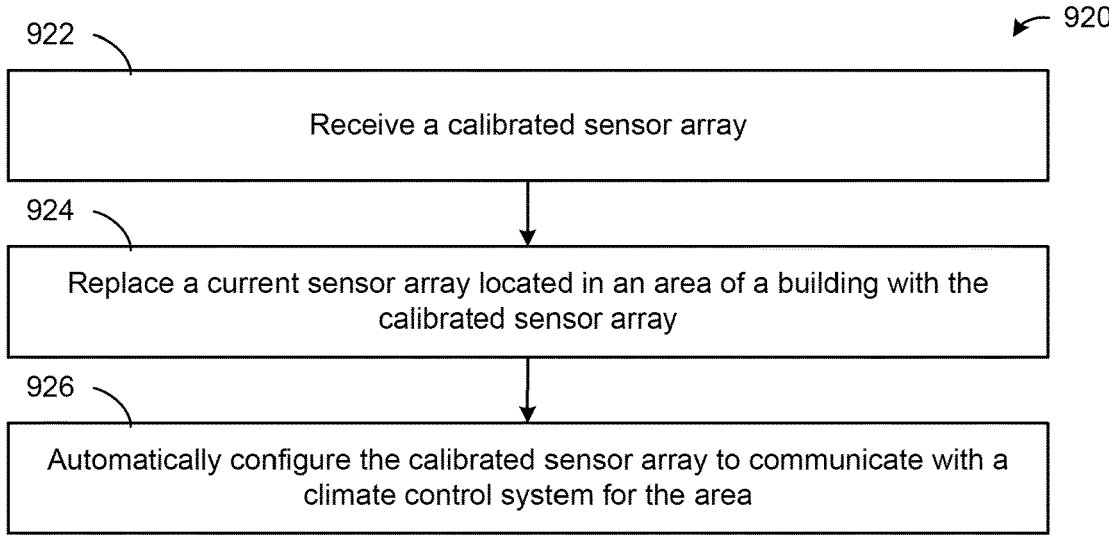

920

922
Receive a calibrated sensor array

924
Replace a current sensor array located in an area of a building with the calibrated sensor array 926
Automatically configure the calibrated sensor array to communicate with a climate control system for the area

FIG. 9B

SMART BUILDING LEVEL CONTROL FOR IMPROVING COMPLIANCE OF TEMPERATURE, PRESSURE, AND HUMIDITY

CROSS-REFERENCE TO RELATED PATENT APPLICATIONS

This application is continuation of U.S. patent application Ser. No. 17/024,376, filed Sep. 17, 2020, which claims the priority to and the benefit of U.S. Provisional Patent Application No. 62/902,338, filed Sep. 18, 2019, both of which are incorporated by reference herein.

BACKGROUND

The present disclosure relates to systems and methods of controlling temperature, humidity, and pressure (TPH) within a room and/or a building. In some cases, TPH for a room and/or a building is monitored and checked for compliance with regulations or process controls. Regulations may include standards set by governmental or non-governmental entities and compliance may be checked by a compliance officer. Checks for compliance of TPH may be checked randomly or on a set routine or schedule and can affect the ability of the building to continue operation (e.g., an out of compliance hospital may be inhibited from providing patient care).

In some embodiments, particularly for a building that serves as a hospital, The Joint Commission (TJC) may administer the compliance checks. In some such embodiments, if the hospital building or a room within the building (e.g., a patient room, an operating room, etc.) is found to be out of compliance, a finding is identified and reported to the Centers for Medicare and Medicaid Services (CMS), who then perform an independent inspection of the building or room. A finding may impact the hospital's ratings, funding, etc., and correcting compliance issues may be expensive and time consuming. Over time, if a hospital regularly fails CMS inspections and/or multiple rooms or devices of the building are regularly non-compliant, a deemed status of the hospital may be lost. The loss of deemed status can result in the withholding of Medicare and/or Medicaid reimbursement to the hospital. In a hospital setting, response to issues affecting TPH in a timely manner is critical. A system for monitoring TPH and related factors could improve a hospital's ability to pass inspections and maintain a healthy environment for patient care.

SUMMARY

One embodiment of the present disclosure is a building management system (BMS) for monitoring and controlling heating, ventilation, or air conditioning (HVAC) parameters in a building. The BMS includes one or more processing circuits including one or more memory devices coupled to one or more processors, the one or more memory devices configured to store instructions thereon that, when executed by the one or more processors, cause the one or more processors to initialize a predictive model for predicting temperature, pressure, and humidity within a target area and an adjacent area of the building, receive target area data from a target area sensor array configured to measure temperature, pressure, and humidity of the target area, receive adjacent area data from an adjacent area sensor array configured to measure temperature, pressure, and humidity of the adjacent area, execute the predictive model based on the target area data and the adjacent area data to generate a prediction of future temperature, pressure, and humidity within the target area, and control operation of HVAC equipment to maintain the temperature, pressure, and humidity of the target area within a compliance standard.

In some embodiments, the one or more memory devices are further configured to store instructions thereon that, when executed by the one or more processors, cause the one or more processors to receive updated target area data from the target area sensor array, receive updated adjacent area data from the adjacent area sensor array, and prior to executing the predictive model, update the predictive model based on the updated target area data and the updated adjacent area data.

In some embodiments, the one or more memory devices are further configured to store instructions thereon that, when executed by the one or more processors, cause the one or more processors to train the predictive model using historical data including at least temperature, pressure, and humidity for the target area and the adjacent area.

In some embodiments, the one or more memory devices are further configured to store instructions thereon that, when executed by the one or more processors, cause the one or more processors to identify compliance issues by comparing the predicted future temperature, pressure, and humidity of the target area with the compliance standard.

In some embodiments, the one or more memory devices are further configured to store instructions thereon that, when executed by the one or more processors, cause the one or more processors to generate a notification in response to identifying compliance issues, the notification indicating one of the predicted future temperature, pressure, or humidity of the target area that is non-compliant, and transmit the notification to a user device.

In some embodiments, the one or more memory devices are further configured to store instructions thereon that, when executed by the one or more processors, cause the one or more processors to receive access control data from one or more door sensor associated with the target area or the adjacent area, wherein the predictive model is executed based on the access control data in addition to the target area data and the adjacent area data.

In some embodiments, at least one of the target area sensor array or the adjacent area sensor array are calibrated by comparing the target area data or the adjacent area data with corresponding sensor data from a calibration unit.

Another embodiment of the present disclosure is a building management system (BMS) for monitoring and controlling heating, ventilation, or air conditioning (HVAC) parameters in a building. The BMS includes one or more processing circuits including one or more memory devices coupled to one or more processors, the one or more memory devices configured to store instructions thereon that, when executed by the one or more processors, cause the one or more processors to receive door sensor data for a space within the building, the door sensor data indicating a position of one or more doors located in the space, receive temperature, pressure, and humidity data from a sensor array positioned within the space, execute a predictive model using the door sensor data and the temperature, pressure, and humidity data to predict future temperature, pressure, and humidity data for the space, and control operation of HVAC equipment associated with the space based on the predicted future temperature, pressure, and humidity data.

In some embodiments, the one or more memory devices are further configured to store instructions thereon that, when executed by the one or more processors, cause the one or more processors to receive updated temperature, pressure, and humidity data from the sensor array, received updated door sensor data, and prior to executing the predictive model, update the predictive model based on at least one of the updated temperature, pressure, and humidity data or the updated door sensor data.

In some embodiments, the one or more memory devices are further configured to store instructions thereon that, when executed by the one or more processors, cause the one or more processors to train the predictive model using at least one of historical temperature, pressure, and humidity data or historical door sensor data for the space.

In some embodiments, the one or more memory devices are further configured to store instructions thereon that, when executed by the one or more processors, cause the one or more processors to identify compliance issues by comparing the predicted future temperature, pressure, and humidity with a compliance standard.

In some embodiments, the one or more memory devices are further configured to store instructions thereon that, when executed by the one or more processors, cause the one or more processors to generate a notification in response to identifying compliance issues, the notification indicating one of the predicted future temperature, pressure, or humidity of the space that is non-compliant, and transmit the notification to a user device.

In some embodiments, the sensor array is calibrated by comparing the received temperature, pressure, and humidity data with corresponding sensor data from a calibration unit.

In some embodiments, the sensor array is removably coupled to the BMS such that the sensor array can be removed and replaced with a calibrated sensor array.

Yet another embodiment of the present disclosure is a system that includes a room sensor positioned in a room and structured to measure temperature, pressure, or humidity within the room, a calibration system including a calibrated sensor corresponding to the room sensor, and one or more processing circuits including one or more memory devices coupled to one or more processors, the one or more memory devices configured to store instructions thereon that, when executed by the one or more processors, cause the one or more processors to communicate with the room sensor and control operation of a heating/cooling system, receive information from the calibration system, and automatically recalibrate the room sensor based on the information received from the calibration system.

In some embodiments, the calibration system includes a calibration schedule set by a manufacturer of the room sensor.

In some embodiments, the system further includes an interface associated with the room, wherein the one or more memory devices are further configured to store instructions thereon that, when executed by the one or more processors, cause the one or more processors to communicate wirelessly with the calibration system, and send display information to the interface regarding calibration of the room sensor.

In some embodiments, the calibration system wirelessly communicates with the one or more processing circuits, and wherein the calibration system automatically initiates a calibration routine.

In some embodiments, the calibration system is structured to communicate with a mobile device, and wherein the mobile device is structured to communicate with the one or more processing circuits and the calibration system to execute a calibration routine.

In some embodiments, the system further includes a second sensor positioned in the room, wherein the calibration system is in communication with the second sensor and uses measurements obtained by the second sensor to calibrate the room sensor.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

Objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 8 is a flow diagram of a process for controlling building equipment based on the interactions between adjacent areas of a building, according to some embodiments.

FIGS. 9A and 9B are flow diagrams of a processes for calibrating a sensor array, according to some embodiments.

DETAILED DESCRIPTION

Referring generally to the FIGURES, a system and methods for monitoring and controlling the environment within various areas of a building are shown, according to some embodiments. More specifically, the system and methods described herein can be implemented to monitor parameters of areas within a building or other facility (e.g., a hospital), in order to identify and correct potential compliance issues. As described herein, compliance issues may generally refer to any indication of non-compliance, where one or more parameters of an area or a building do not meet a set of compliance standards (e.g., standard or predetermined values). The parameters generally include at least temperature, pressure, and humidity (TPH) of a room, area, or building.

In some embodiments, the systems and methods described herein may be applied to rooms or spaces within a hospital or another industrial building where TPH must be monitored and checked for compliance with regulations or process controls. As described above, compliance regulations may include standards set by governmental or non-governmental entities and compliance may be checked by a compliance officer. Checks for compliance of TPH may be checked randomly or on a set routine or schedule and can affect the ability of the building to continue operation (e.g., an out of compliance hospital may be inhibited from providing patient care). In some cases, a third party may administer the compliance checks and/or may establish compliance standards.

The systems and methods described herein may continually monitor TPH measurements from any number of rooms or areas within a building (e.g., a hospital). The TPH data may be used to identify and/or predict non-compliance issues. In some embodiments, sensor data from a security system or other subsystem of a building may be utilized to further improve TPH prediction. Predicted TPH for areas within the building can be utilized to control HVAC equipment to maintain the TPH values within compliance standards. In this regard, the systems and methods described herein can help a facility (e.g., a hospital) maintain compliance standards to decrease downtime due to compliance issues and, in some cases, to decrease or avoid equipment faults.

Additionally, in some embodiments, adjacent areas can greatly impact the TPH of one another. For example, a room can lose heat through a wall or ceiling to another, adjacent room. In another example, the pressure of a room may decrease suddenly when opening a door, and the pressure of an adjacent area (e.g., a room, a hallway) may suddenly increase proportionally. Accordingly, the systems and methods described herein can help to predict and minimize the impact of adjacent spaces through the use of sensor arrays and predictive models. The sensor arrays may be regularly calibrated to ensure accurate measurements. Additional features and advantages of the present disclosure are described in greater detail below.

Building with Building Systems

Figure 1:
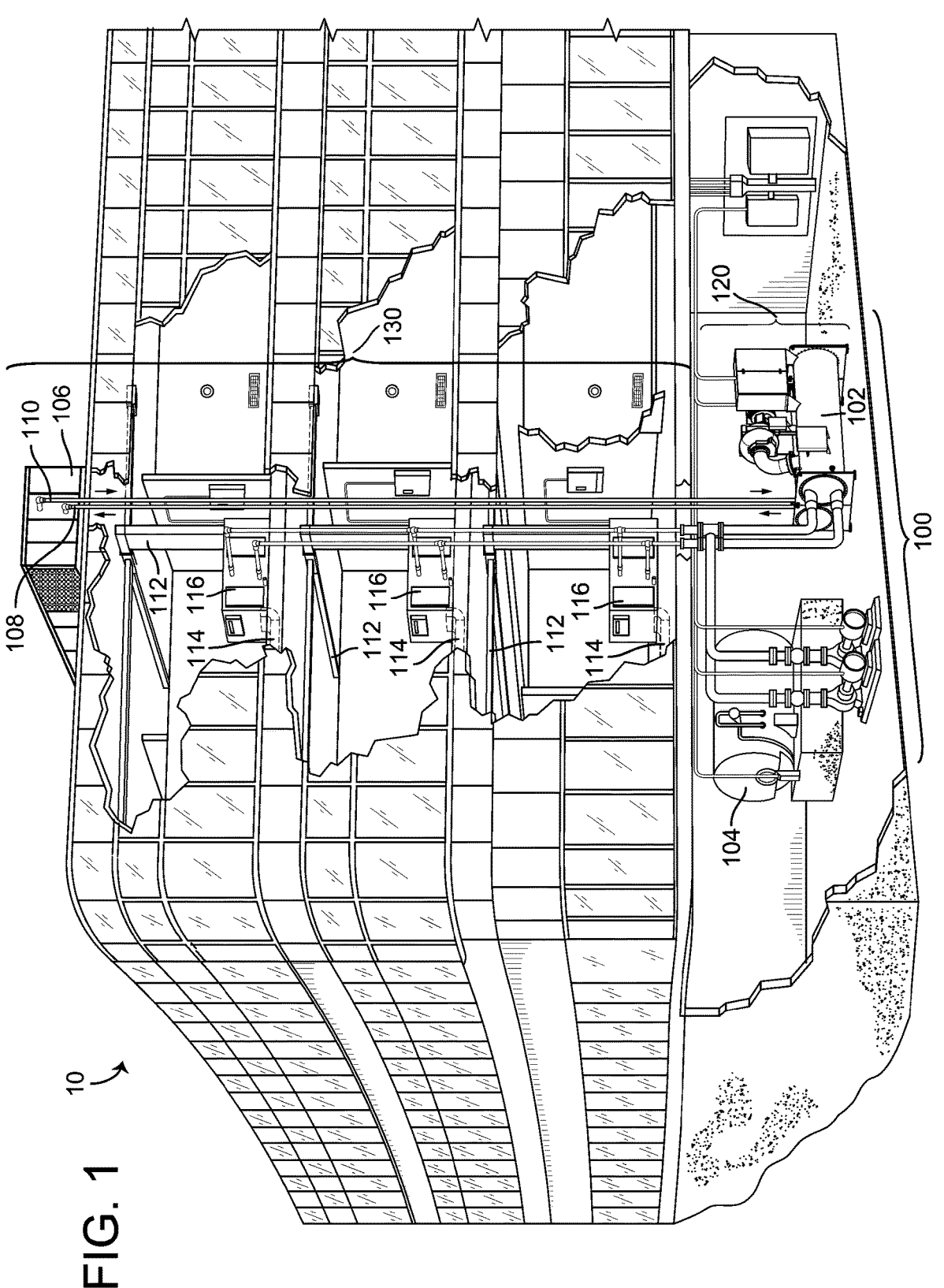
FIG. 1 is a drawing of a building equipped with a HVAC system, according to some embodiments.
Figure 2:
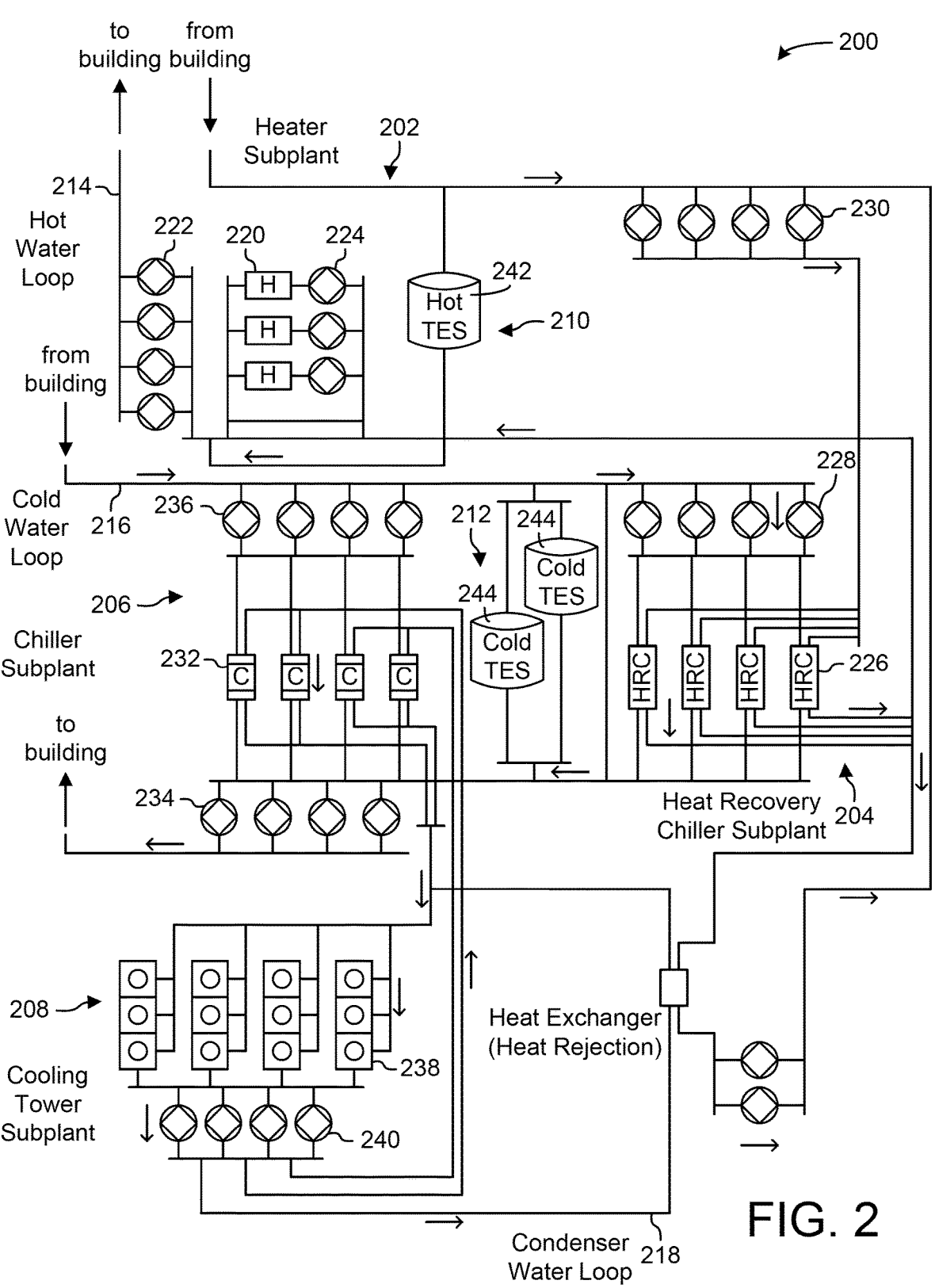
FIG. 2 is a block diagram of a waterside system that may be used in conjunction with the building of FIG. 1, according to some embodiments.
Figure 3:
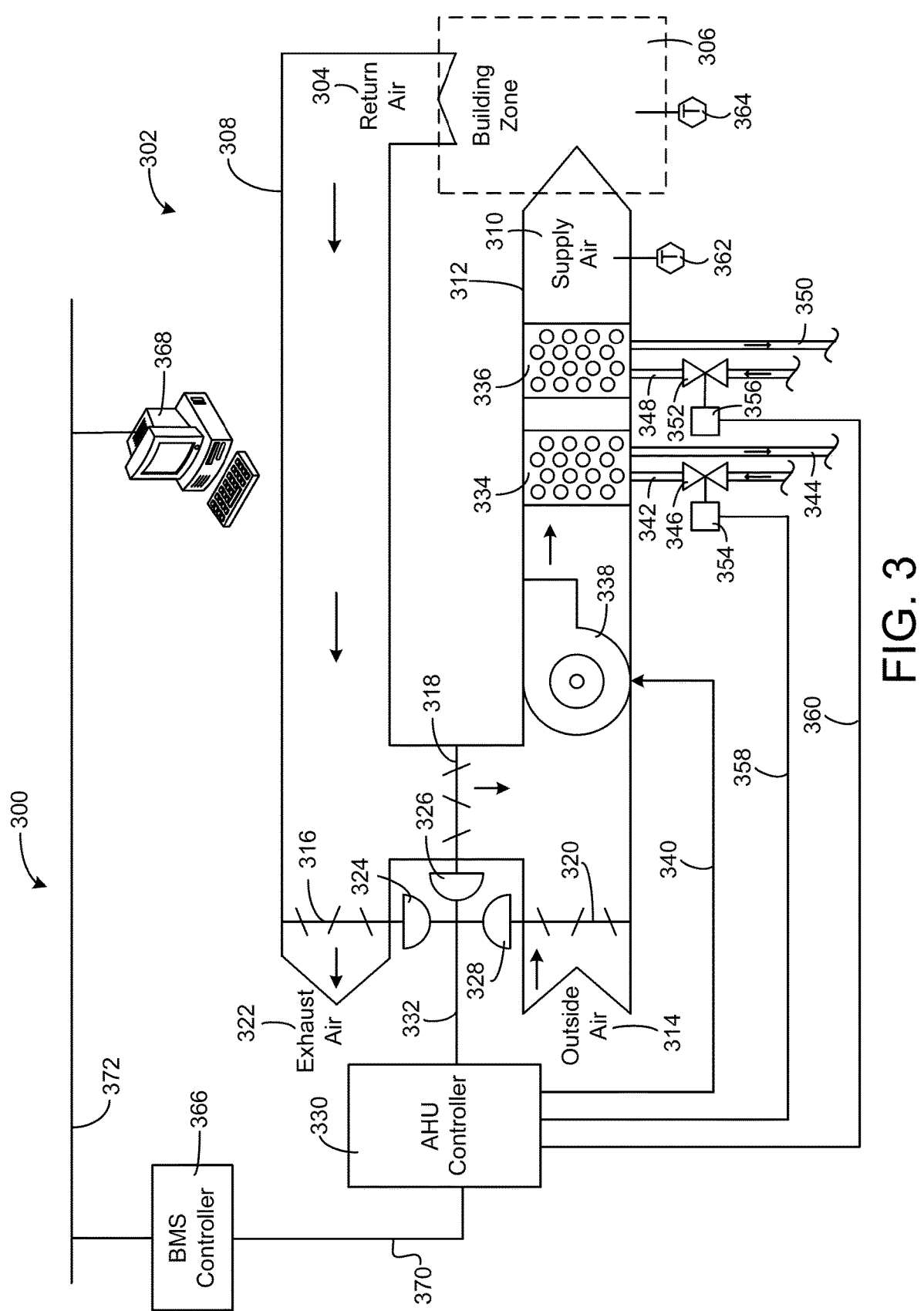
FIG. 3 is a block diagram of an airside system that may be used in conjunction with the building of FIG. 1, according to some embodiments.
Figure 4:
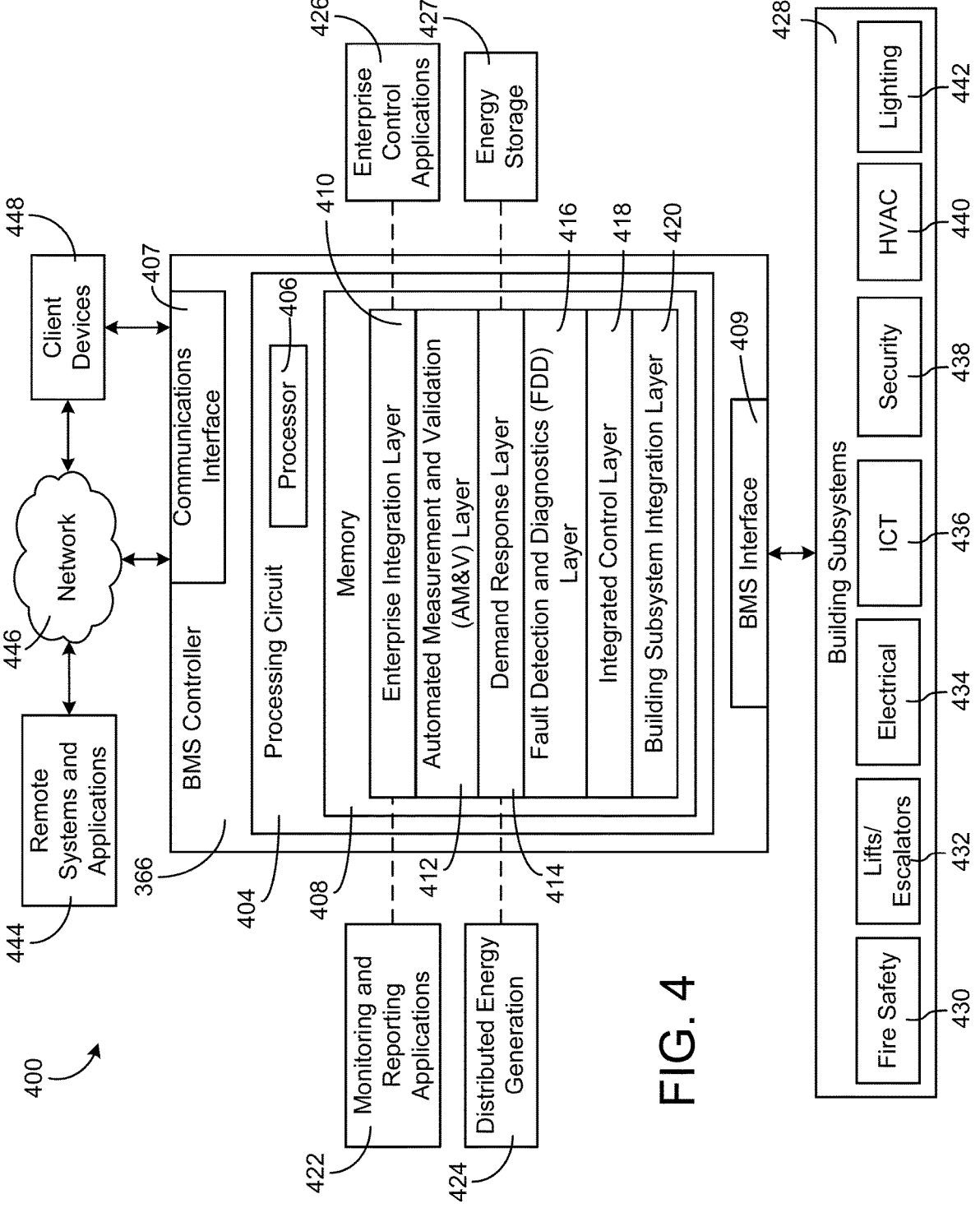
FIG. 4 is a block diagram of a building management system (BMS) that may be used to monitor and/or control the building of FIG. 1, according to some embodiments.
Figure 5:
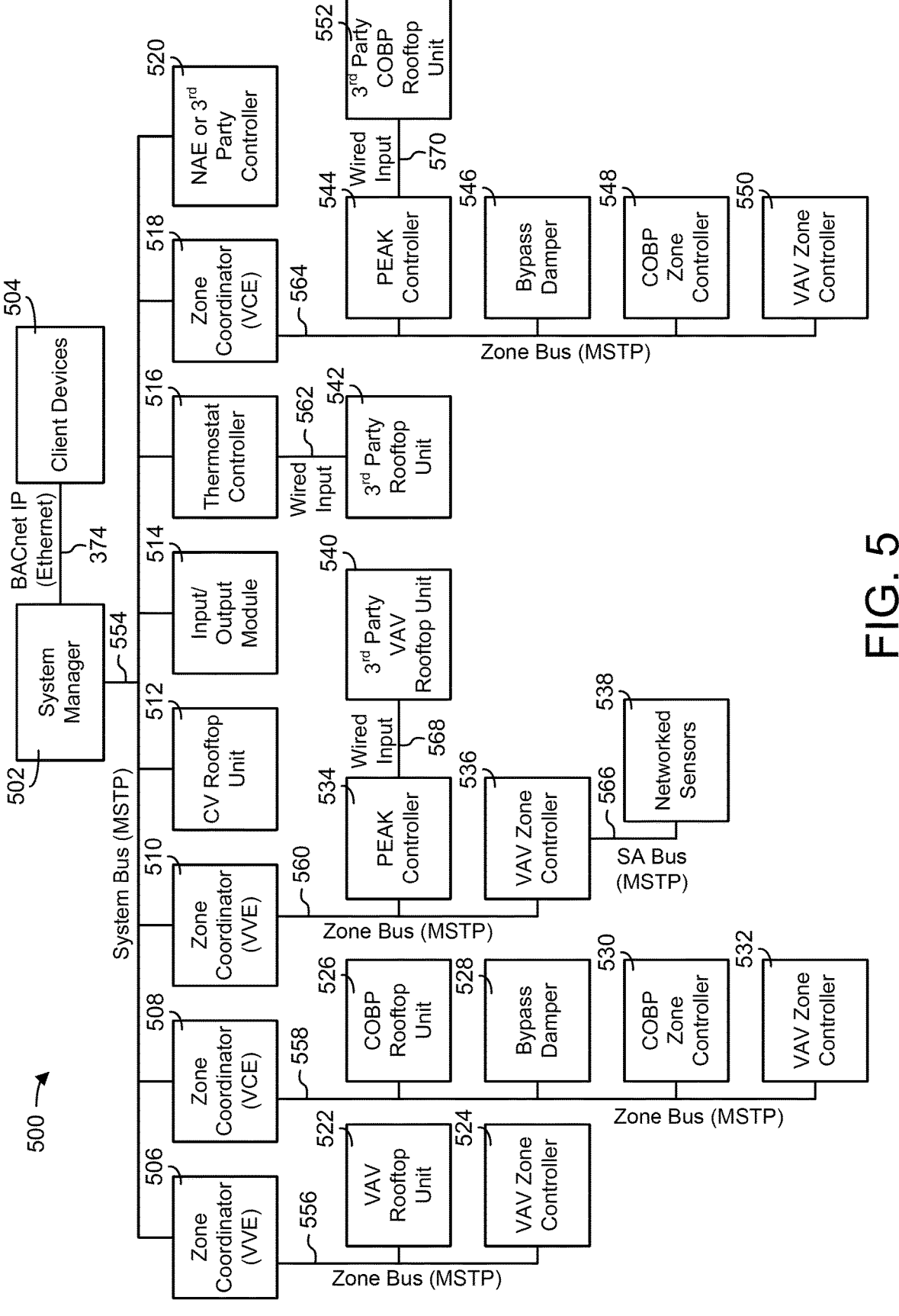
FIG. 5 is a block diagram of another building management system (BMS), according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 (e.g., a hospital) equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration layer 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response layer 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

As shown in FIG. 5, a BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (TOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., TOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

TPH Management

Figure 6:
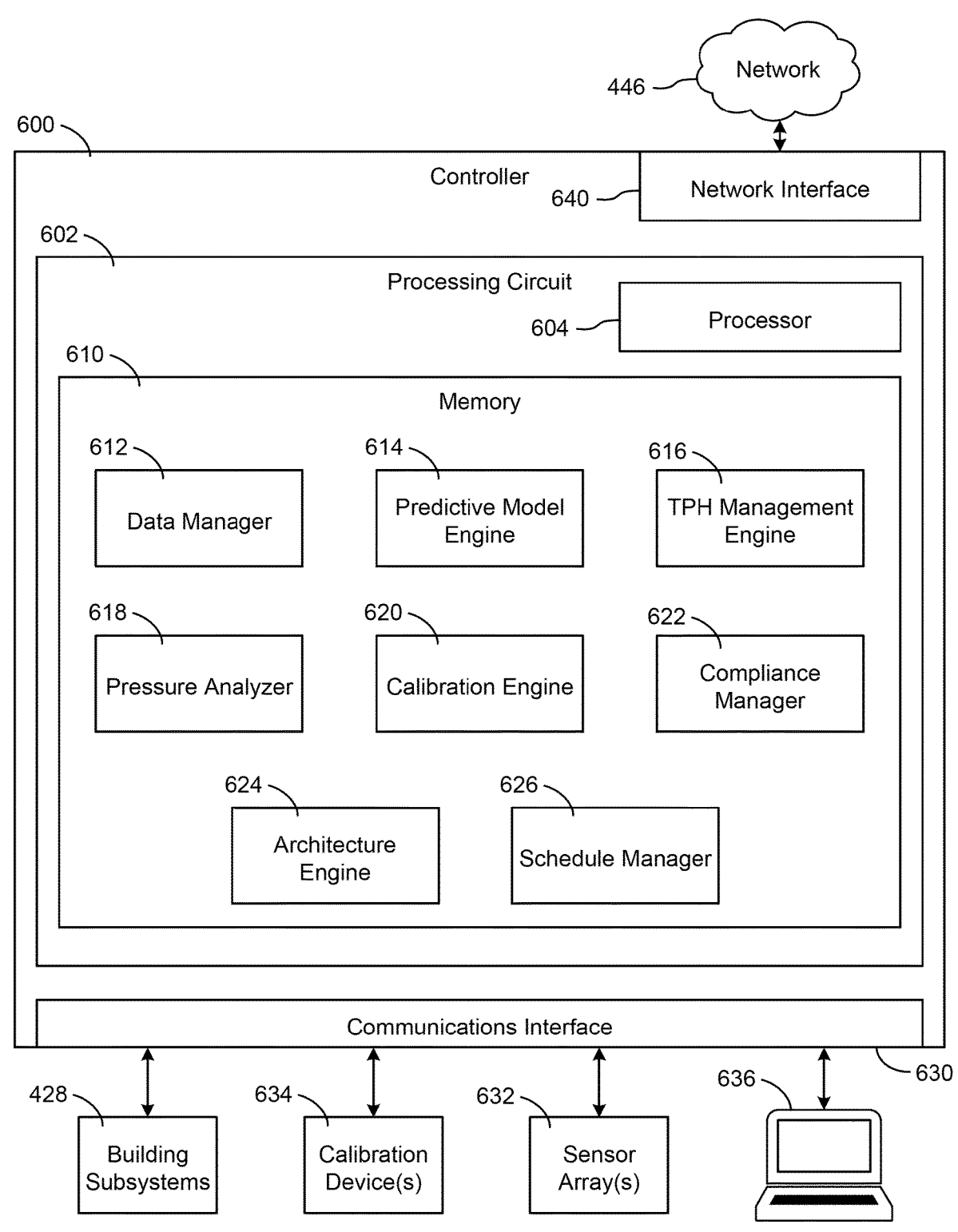
FIG. 6 is a block diagram of a controller for smart building control, according to some embodiments.

As shown in FIG. 6, a controller 600 is generally structured for smart building control, according to some embodiments. More specifically, the controller 600 may be structured to monitor and/or predict TPH of one or more areas (e.g., rooms) within a building (e.g., a hospital) in order to adjust climate control devices (e.g., HVAC equipment) accordingly. In some cases, the climate or environment (e.g., at least TPH) of an area or room within a building may be affected by other, adjacent areas. For example, adjacent rooms may affect the TPH of one another, and opening and closing doors to a room can change the TPH within the room or an adjacent area (e.g., a hallway). Accordingly, the controller 600 described herein may be configured to analyze sensor data to predict TPH changes and adjust equipment operations accordingly.

The controller 600 may be structured to receive data from various sensors and subsystems of the building 10 and/or the BMS 400 or 500, and may analyze the data to identify compliance issues and/or to predict the TPH of different areas with the building 10. As described in more detail below, the controller 600 may even be at least partially implemented within the BMS 400 or the BMS 500. The controller 600 may provide automated or semi-automated control over the climate within areas of a building in order to maintain TPH compliance (e.g., based on standards set by TJC or CMS, as described above). Unlike certain other systems, the controller 600 may be interfaced with various building subsystems (e.g., the building subsystems 428) in addition to an HVAC subsystem (e.g., the HVAC 440). This may lead to increased accuracy in future TPH predictions, increased energy efficiency, and increasingly compliant systems.

The controller 600 is shown to include a communications interface 630 for exchanging data with a wide variety of external systems, devices, or components. In other words, the communications interface 630 may be configured to facilitate the exchange (i.e., sending and receiving) of data between the controller 600 and one or more other components. In some embodiments, the communications interface 630 provides an interface between the controller 600 any of the components of the BMS 400 or the BMS 500 described above. In this regard, the communications interface 630 can include a BACnet interface in addition to other types of communications interfaces (e.g., Modbus, LonWorks, DeviceNet, XML, etc.). For example, the controller 600 is shown to communicate with the building subsystems 428 via a communications interface 630. In some embodiments, the communications interface 630 may be configured to exchange data via the network 446 and may include appropriate interfaces for communicating on the network 446. For example, the communications interface 630 may include a wired and/or wireless interface for connecting the controller 600 to the Internet, or to an intranet. In other embodiments, as shown in FIG. 6, the controller 600 includes a network interface 640 configured to facilitate the exchange of data between the controller 600 and the network 446.

As mentioned, the controller 600 is shown to be communicably coupled to any of the building subsystems 428, as described above. In this regard, the controller 600 may receive data regarding one or more parameters of the various building subsystems, analyze or process the data, and control one or more of the building subsystems 428 based on the data. In some embodiments, the controller 600 may be integrated with at least the security subsystem 438 and the HVAC subsystem 440. In this regard, the controller 600 may receive data from sensors and/or access control devices of the security subsystem 438, and may control various devices of the HVAC subsystem 440. In embodiments, the controller 600 may be coupled to the building subsystems 428 either directly (e.g., through a wired connection) or indirectly (e.g., via the network 446).

In some embodiments, the communications interface 630 also facilitates communication between the controller 600 and one or more sensor arrays 632. The sensor arrays 632 can include any number of sensors for measuring any of a variety of parameters associated with an area (e.g., a room) within a building and/or the building subsystem devices associated with the area (e.g., HVAC equipment). The sensor arrays 632 can include, for example, humidity sensors, temperature sensors, pressure sensors, and other sensors. More generally, the sensor arrays 632 can include any sensors that measure factors indicative of an environment within an area of a building. In some embodiments, such as when the area is an operating room or a patient room in a hospital, the sensor arrays 632 can include any sensors that are necessary to ensure patient comfort and safety, and to monitor/maintain an environment that meets compliance standards for hospitals. In general, the sensor arrays 632 include sensors configured to measure at least TPH of an area.

In some embodiments, the communications interface 630 also facilitates communication between the controller 600 and one or more calibration devices 634. The calibration devices 634 can include a calibrated sensor array that includes one or more sensors that are functionally equivalent to, or the same as, the sensors of the sensor arrays 632. For example, the calibration devices 634 can include one or more sensors configured to measure TPH. In some embodiments, the calibration devices 634 include a portable unit that includes one or more sensors and that can be wirelessly coupled to the controller 600 to perform calibration procedures. In some embodiments, calibration devices 634 are a direct replacement for one of the sensor arrays 632. The calibration devices 634 may be shipped to a particular location or user after having been calibrated by a manufacturer or calibration specialist. Accordingly, the calibration devices 634 may be utilized to calibrate the sensor arrays 632.

As shown, the communications interface 630 also facilitates communication between the controller 600 and at least one user device 636. The user device 636 may be any electronic device that allows a user to interact with the controller 600 through a user interface. Examples of user devices include, but are not limited to, mobile phones, electronic tablets, laptops, desktop computers, workstations, and other types of electronic devices. The user device 636 may be similar to the client device 368 and/or the client devices 448, as described above. The user device 636 may display graphical user interfaces or other data on a display, thereby enabling a user to easily view data and interact with the controller 600.

In some embodiments, the controller 600 may also store and/or retrieve data from one or more external system (e.g., servers, computers, databases, etc.). In such embodiments, the controller 600 may communicate with any external systems via network interface 640, and thereby via network 446. The external systems many include the remote systems and applications 444, described above, for example. In some embodiments, at least one of the remote systems and applications 444 is an external database. The external database can be implemented in a variety of ways. For example, the external databases may include one or more memory devices or remote storage devices. The external databases may also include workstations, personal computers, servers, etc., and may include one or more on-premises server computers/databases and/or one or more cloud-based databases. In this sense, the external databases may be distributed across a variety of physical hardware devices.

Still referring to FIG. 6, the controller 600 includes a processing circuit 602, which further includes a processor 604 and memory 610. It will be appreciated that these components can be implemented using a variety of different types and quantities of processors and memory. The processing circuit 602 can be communicably connected to the communications interface 630 and/or the network interface 640 such that processing circuit 602 and the components thereof can send and receive data via the communications interface 650 and/or the network interface 640. The processor 604 can be implemented as a general purpose processor, an application specific integrated circuit (ASIC), one or more field programmable gate arrays (FPGAs), a group of processing components, or other suitable electronic processing components.

The memory 610 (e.g., memory, memory unit, storage device, etc.) can include one or more devices (e.g., RAM, ROM, Flash memory, hard disk storage, etc.) for storing data and/or computer code for completing or facilitating the processes, layers and modules described in the present application. The memory 610 can be or include volatile memory or non-volatile memory. The memory 610 can include database components, object code components, script components, or any other type of information structure for supporting the activities and information structures described in the present application. According to an example embodiment, the memory 610 is communicably connected to the processor 604 via the processing circuit 602 and includes computer code for executing (e.g., by the processing circuit 602 and/or the processor 604) one or more processes described herein.

In some embodiments, the controller 600 is implemented within a single computer (e.g., one server, one housing, etc.). In other embodiments the controller 600 can be distributed across multiple servers or computers (e.g., that can exist in distributed locations). In some embodiments, the controller 600 is embodied in the BMS 400 or the BMS 500 as described above, and accordingly, the processing circuit 602, the processor 604, and/or the memory 610 may be similar to or the same as the processing circuit 404, the processor 406 and/or the memory 408 as described above. Additionally, in such embodiments, the components of the memory 610, described below, may be embodied in the BMS 400. In other embodiments, the controller 600 is a stand-alone device or component not embodied in the BMS 400 or the BMS 500, and therefore includes its own dedicated processing circuit 602, processor 604, and/or memory 610. In yet other embodiments, the controller 600 is embodied as a portion of the BMS 400 or the BMS 500, a differently arranged BMS, or a building automation system (BAS), and accordingly may share a processing circuit, processor, and/or memory with any of these other BMSs or BASs.

The memory 610 is shown to include a data manager 612. The data manager 612 may be configured to receive and/or preprocess signals or data from the building subsystems 428, the sensor arrays 632, and/or the calibration devices 634. In some embodiments, the data manager 612 receives at least TPH data from the sensor arrays 632 and directs the TPH data to other components of memory 610. As briefly described above, the TPH data can be any sort of sensor data or signal relating to temperature, pressure, and humidity of an area, and measured by one or more sensors of the sensor arrays 632. In some embodiments, the data manager 612 preprocesses the TPH data, or any of the other data described below, such as by reformatting the data, modifying the data to remove outliers, reducing noise in signals, etc. It will be appreciated that the data manager 612 may implement any suitable preprocessing based on the type and format of received data.

In some embodiments, the data manager 612 also receives data from the building subsystem 428, and more specifically from the HVAC subsystem 440 and the security subsystem 438. Data from the HVAC subsystem 440 may include, for example, operational data or parameters relating to any HVAC equipment within a building (e.g., the building 10). As another example, the HVAC data may include operational states, power consumption values, sensor measurements, operating schedules, or any other data associated with the operation of HVAC equipment. The data received from the security subsystem 438 generally includes access control data, such as door sensor data. The door sensor data indicates a state (e.g., open or closed) of doors throughout a building. In some embodiments, door sensor data may be received directly from access control devices, such as door sensors, and the data manager 612 is accordingly coupled to the access control devices rather than an entire security subsystems.

In some embodiments, the data manager 612 is also configured to manage data storage and retrieval (i.e., data management). The data manager 612 may be configured to store received data in an internal database (e.g., a partition within memory 610), for example. In some embodiments, the internal database may be a separate memory device that is internal to the controller 600 and/or the BMS 400. In some embodiments, the data manager 612 may transmit data to one or more of the external databases, as previously described, via network interface 640. In this regard, the data manager 612 may also retrieve data from either an internal database or external database for additional processing or analysis.

The memory 610 is also shown to include a predictive model engine 614. The predictive model engine 614 is generally configured to generate, train, and/or execute a predictive model for predicting TPH for an area or areas of a building. The predictive model can be any suitable type of neural network, machine learning model, or other artificial intelligence system. In some embodiments, the predictive model may include a model based predictive engine based on previous data, decision trees, and other algorithms. The predictive model is generally selected or designed for a specific installation or building. For example, an artificial intelligence system may be structured to learn the specific TPH dynamics of a hospital area (e.g., patient rooms, operating rooms, commons paces, etc.). The predictive model engine 614 may also be configured to continuously update the predictive model based on real-time senor data. In some embodiments, the predictive model is dynamically modified using a reinforcement learning schema to improve the accuracy of trend data predictions over time.

In some embodiments, sensor data relating to TPH for a first area and any adjacent areas, along with door sensor data indicating a state (e.g., open or closed) of doors within the first area or adjacent areas, is used to execute the predictive model. Accordingly, the predictive model engine 614 may receive TPH data from the sensor arrays 632 and door sensor data from the security subsystem 438 via data manager 612.

The predictive model may then be executed using the sensor and door data to generate a prediction of future TPH within a target room (e.g., the first room). In this manner, the predictive model may take into account the impact of opening and closing of doors to the space or room, which is known to effect the TPH of a space. Additionally, the predictive model may indicate the impact of rooms or spaces that are adjacent to a target space with respect to TPH.

In some embodiments, the sensor data may include ambient temperature, pressure, or humidity information. In some embodiments, the ambient temperature, pressure, or humidity information is received from a weather station located at the building or remotely (e.g., a remote weather service). The predictive model engine 614 receives the ambient information and predicts an impact of the ambient information on the TPH within the target space. For example, if the ambient conditions predict a heat spike in the afternoon, the predictive model engine 614 is able to predict the effect of the ambient conditions and control the HVAC equipment to successfully avoid compliance issues due to changing ambient conditions.

The memory 610 is also shown to include a TPH management engine 616. The TPH management engine 616 is generally configured to generate parameters or control decisions for controlling HVAC equipment in order to maintain or adjust TPH within an area of a building. Additionally, the memory 610 may include a pressure analyzer 618 configured to monitor pressure within an area of between adjoining areas of a building, and to adjust pressure within an area. In some embodiments, the TPH management engine 616 and the pressure analyzer 618 are integrated to accurately monitor TPH within an area and/or pressure between adjacent areas, and/or to generate control decisions to maintain TPH based on compliance standards.

In some embodiments, the TPH management engine 616 and/or the pressure analyzer 618 are configured to adjust parameters of HVAC equipment (e.g., of the HVAC subsystem 440) in response to the detection of compliance issues, or the prediction of future compliance issues, by a compliance manager 622. Accordingly, the TPH management engine 616 and/or the pressure analyzer 618 can control the HVAC equipment to adjust any of the TPH parameters within an area to maintain compliance, or to bring the TPH of the area back into compliance. For example, if the compliance manager 622 determines that the pressure of a room may become non-compliant within a future time interval (e.g., based on the predictive model), one of the TPH management engine 616 and/or the pressure analyzer 618 may operate HVAC equipment (e.g., an AHU) to increase the pressure in the room to maintain compliance.

The compliance manager 622 is generally configured to identify TPH compliance issues and compare information received from the sensor arrays 632 to compliance standards established by the TJC and the CMS. In some embodiments, the compliance manager 622 can query a remote database or server to retrieve stored compliance standards. In some such embodiments, the compliance manager 622 may query a third party system in order to receive the most up-to-date compliance standards. For example, the compliance manager 622 may receive compliance standards directly from a server or website associated with TJC. In some embodiments, the compliance manager 622 may query an external system or database at a regular time interval, to maintain accurate compliance standards. As such, the compliance manager 622 may provide enhanced compliance analysis over other systems and methods by avoiding out-of-date standards. However, in certain other embodiments, compliance standards may be manually entered (e.g., by a user).

In some embodiments, the compliance manager 622 is configured to identify future compliance issues based on predictions generated by the predictive model engine 614. For example, the compliance manager 622 can compare predicted future TPH for a target space by comparing the predictions to compliance standards. If compliance issues are predicted, the compliance manager 622 and/or the TPH management engine 616 can initiate preventative maintenance to correct or avoid the compliance issues.

In some embodiments, the compliance manager 622 analyzes real-time or near real-time data received from the sensor arrays 632 to detect compliance issues. In such embodiments, the compliance manager 622 may compare the TPH measurements to a range of acceptable TPH values, as identified by the compliance standards. TPH trend data developed by the predictive model engine 614 for a room and/or building may be used to identify potential future non-compliance issues. TPH values that fall outside of an acceptable range may indicate non-compliance. In some embodiments, the compliance manager 622 may analyze predicted future TPH data generated by the predictive model engine 614 to identify future compliance issues before they occur. In such embodiments, the compliance manager 622 can predict future compliance issues based on the predicted TPH data.

The memory 610 is also shown to include a calibration engine 620. The calibration engine 620 may be configured to identify sensors (e.g., of the sensor arrays 632) that require calibration and may facilitate the calibration of identified sensors or sensor arrays. For example, one or more of the sensor arrays 632 may need calibration at a regular interval (e.g., every six months) to maintain compliance and improve the accuracy of measurements. The calibration engine 620 may identify upcoming calibration requirements and may perform a calibration of any particular sensors or sensor arrays. In some embodiments, the calibration engine 620 receives first data from a first, calibrated sensor array and compares the first data to second data received from a second, non-calibrated sensor array. The second sensor array can then be calibrated (e.g., by adjusting weights or other parameters for processing the second data) to match the first data. In other embodiments, a non-calibrated sensor array (e.g., of the sensor arrays 632) may be completely replaced with a calibrated sensor array. The various functions of the calibration engine 620 are described in more detail below, with respect to FIGS. 9A and 9B.

The memory 610 is also shown to include an architecture engine 624. The architecture engine 624 may be configured to identify how the structure of a building or room effects TPH for the building or room. Accordingly, the architecture engine 624 may determine improvements to the layout of an area and/or to the design or structure of the building. For example, the architecture engine 624 may identify a non-optimal room design, layout, or construction that results in frequent compliance issues, or difficulty maintaining compliant TPH. The architecture engine 624 may determine how the design, layout, or construction of the room may be improved (e.g., in new construction, with renovation) to increase efficiency and compliance.

The memory 610 is also shown to include a schedule manager 626. The schedule manager 626 may be configured to generate and/or implement equipment operating schedules and/or calibration schedules. For example, the schedule manager 626 may generate or determine operating schedules for various building equipment (e.g., HVAC equipment). In some embodiments, the schedule manager 626 generates a schedule for calibrating sensors or the sensor arrays 632. In such embodiments, the schedule manager 626 can generate and transmit a notification of upcoming calibration requirements to user device 636 or another system. In some embodiments, the schedule manager 626 can even initiate a routine calibration process based on the schedule. In some embodiments, a calibration schedule is determined by a manufacturer of a sensor or sensor array (e.g., the sensor arrays 632), and/or is determined by a manufacturer of a calibration unit, as described below with respect to FIGS. 9A and 9B.

In some embodiments, the schedule manager 626 also receives schedules associated with an area (e.g., a room) to improve predictions of future TPH for the area. In a hospital, for example, the schedule manager 626 may receive an indication of future occupancy in a patient room or operating room, and the predictive model engine 614 may utilize this indication in generating a TPH prediction for the room. To continue this example, if a surgeon request particular TPH settings in an operating room at a particular time, the TPH of the operating room and adjacent rooms may be affected. In some embodiments, the schedule manager 626 may interface with an external scheduling system to receive such indications.

Figure 7:
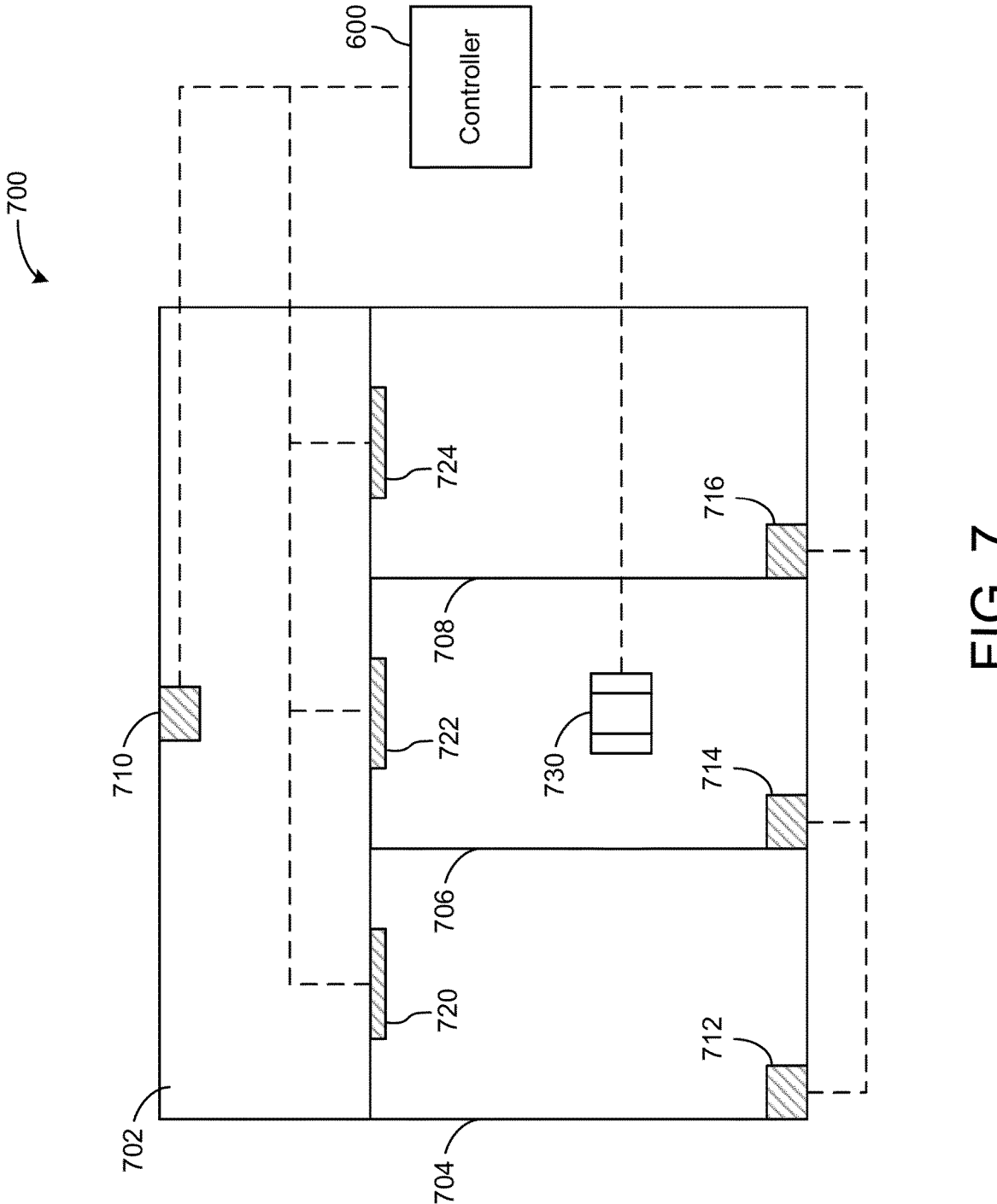
FIG. 7 is a block diagram of a system for climate control of one or more areas of a building, according to some embodiments.

Referring now to FIG. 7, a system 700 for climate control of one or more areas of a building (e.g., building 10) is shown, according to some embodiments. FIG. 7 may illustrate, for example, at least a portion of a building that includes the BMS 400 and/or 500, as described above, and the controller 600, also described above. In one example, FIG. 7 is an example of a rooms and a hallway within a hospital. The system 700 may be configured to monitor data from various sensor arrays and access control sensors, in order to determine control decisions for various other systems of the building. Further, the system 700 may determine how areas (e.g., rooms) within a building affect TPH in other, adjacent rooms, as described in detail below.

The system 700 is shown to include a hallway 702 and rooms 704-708. The hallway 702 and the rooms 704-708 can represent any similar areas of a building, and are used here to represent various types of spaces that may be included in a building such as a hospital. In one example, each of rooms 704-708 may be patient rooms and/or operating rooms in a hospital. Similarly, hallway 702 may represent a hallway or a common area in the hospital. In any case, each of the hallway 702 and the rooms 704-708 are distinct spaces within a building that are separated by walls, doors, windows, etc.

Each of the rooms 704-708, along with the hallway 702, are shown to include a sensor array, shown as sensor arrays 710-716. As described above with respect to FIG. 6, each of the sensor arrays 710-716 can include any number of sensors for measuring any of a variety of parameters associated with an area (e.g., a room) within a building and/or the building subsystem devices associated with the area (e.g., HVAC equipment). In general, the sensor arrays 710-716 may include humidity sensors, temperature sensors, pressure sensors, and other sensors for measuring TPH within a corresponding room.

Each of the rooms 704-708 are also shown to include a door sensor, shown as door sensors 720-724. The door sensors 720-724 may be access control devices attached to a corresponding door and coupled to the security subsystem 438. The door sensors 720-724 may indicate a position of the correspond door (e.g., open or closed) and an open time indicating how long a door was in the open position. Each of the sensor arrays 710-716 and the door sensors 720-724 are shown to be communicably coupled to the controller 600. Accordingly, the controller 600 may receive data from each of the sensor arrays 710-716 and the door sensors 720-724. As described in greater detail below with respect to FIG. 8, sensor data received from the sensor arrays 710-716 and the door sensors 720-724 can be utilized to predict future TPH for any of the hallway 702 and/or the rooms 704-708.

The system 700 is also shown to include a calibration unit 730. The calibration unit 730 may be a calibrated sensor array, similar to one of the sensor arrays 710-716, that may be coupled to the controller 600 (e.g., wired or wirelessly) to perform a calibration routine. In some embodiments, the calibration unit 730 is carried into a room (e.g., room 706, in this example) and wirelessly connected to the controller 600. The calibration unit 730 measures TPH within room 706 and transmits the TPH values to the controller 600. Subsequently, the controller 600 compares TPH values from the sensor array 714 to the values from the calibration unit 730 and calibrates either the sensor array 714 or the analysis processes performed by the controller 600 itself accordingly (e.g., to match the calibration unit 730). In some embodiments, the calibration unit 730 is a replacement for one of the sensor arrays 710-716. In such embodiments, a user may remove one of the sensor arrays 710-716 from a corresponding area and replace the removed sensor array with the calibration unit 730. Calibration processes for system 700 are described in greater detail below with respect to FIGS. 9A and 9B.

Referring now to FIG. 8, a process 800 for controlling building equipment based on the interactions between adjacent areas of a building is shown, according to some embodiments. The process 800 can be implemented by the controller 600, in some cases. As described above, the climate or environment (e.g., at least TPH) of an area or room within a building may be affected by other, adjacent areas. For example, a very cold room may cause the temperature in an adjacent room to drop (e.g., by removing heat through a wall). Additionally, opening and closing doors to an area can change the TPH within the area. By implementing the process 800, a controller (e.g., controller 600), BMS, BAS, or other similar system may predict future TPH values for a target area within a building based on at least door sensor data and the TPH of other, adjacent areas, and may adjust operations of climate control devices (e.g., HVAC equipment) accordingly. It will be appreciated that certain steps of the process 800 may be optional and, in some embodiments, the process 800 may be implemented using less than all of the steps.

At step 802, first sensor data is received from sensor arrays and/or door sensors associated with a first room and a second, adjacent room. It will be appreciated that, while denoted herein as a first and second "room," the first and second room may be any space or area within a building (e.g., a hallway, a common area, etc.). As mentioned above, the second room may be any space that is adjacent to the first room such that the first and second rooms share a wall, floor, ceiling, window, doorway, etc., such as described above with respect to FIG. 7. Accordingly, the first room may be a "target room" for the analysis of process 800, although it will also be appreciated that the second room could be the target room. The first data generally includes at least TPH for the first room and the second room, measured by a sensor array (e.g., the sensor arrays 632). The first data also generally includes door sensor data received from an access control system of the building (e.g., the security subsystem

438) that indicates whether one or more doors of associated with the first and/or second rooms are open or closed. In some cases, the door sensor data is optional, and process 800 may be implemented using only sensor array data corresponding to TPH.

In some embodiments, the first sensor data is received (e.g., by controller 600) and stored in an internal or external database. In this regard, the first data may be stored and/or retrieved from a database at step 802. In some embodiments, the first data is stored at step 802 and is retrieved at subsequent steps. Accordingly, in some embodiments, the first data is historical TPH and/or door sensor data for a plurality of previous time steps. In some cases, the first data is collected over time from a target building or from other buildings that are similar in structure to the target building. In other embodiments, the first data is a generic or simulated data set.

At step 804, a predictive model is trained using the first sensor data. Training the predictive model prepares the model for future execution, by adjusting weights and/or parameters, or otherwise modifying the model based on a training data set. In some embodiments, the first sensor data is divided into the training set and a test set, where the training set is used to train and tune the model (e.g., the weights and other parameters of the model, the nodes of a neural network, the reinforcement rewards of a reinforcement learning scheme, etc.). As described herein, for example, the predictive model may be trained using TPH and/or door sensor data from multiple, adjacent rooms, in order to improve the predictive model. The test set may be used to validate the training of the model and/or to further fine-tune the model.

As an example, the training data set may indicate a TPH for the first and second rooms at a plurality of time steps. In this regard, the training set may include, for each time step, TPH measurements for the first and second rooms, along with an indication of whether doors of the first and second rooms were open at the time step. The predictive model may be trained to determine how the TPH of the second rooms affect the first room, or vice-versa. Similarly, the predictive model may be trained to determine how the opening or closing of doors in the first and/or second rooms affects the TPH within the other, adjacent spaces.

At step 806, the predictive model is initialized to identify a TPH relationship between the first room and the second room. In other words, the predictive model, having been trained and validated using the first sensor data, may be executed a first time based on the first sensor data in order to identify how the first and second rooms affect one another. For example, based on the predictive model, it may be determined that when the second room is 3° F. warmer than the first room, the first room can be expected to increase in temperature at a rate of +0.2° F./hour. In another example, if a door to the first room is opened, the pressure of the adjacent second room or an adjacent hallway may increase or decrease proportionally.

At step 808, second sensor data is received from the sensor arrays and/or the door sensors associated with the first room and the second room. Similar to the first data, the second data generally includes at least TPH for the first room and the second room, measured by a sensor array (e.g., the sensor arrays 632), and in some cases includes door sensor data received from an access control system of the building (e.g., the security subsystem 438) that indicates whether one or more doors of associated with the first and/or second rooms are open or closed. The second data may be received only after training and initializing the predictive model to identify an "initial" relationship between the first and second rooms.

At step 810, the predictive model is updated based on the second sensor data. In other words, the predictive model may be regenerated or dynamically modified based on the second data, which can include updated TPH and/or door sensor data. In doing so, the predictive model may be improved over time by continually adjusting the relationship between the first and second rooms. For example, improving the predictive model may provide more accurate predictions for the effects of TPH on adjacent spaces and/or the effects of opening/closing doors. In some embodiments, updating the predictive model may include changing parameters of the model such as the weights assigned to various algorithms or variables within the model or updating policies within a machine learning scheme. It will be appreciated that steps 808 and 810 may, in some cases, be optional (e.g., the predictive model may not be updated prior to implementation), and may also be implemented at any point during the implementation of process 800. For example, the predictive model may learn the system operating habits and parameters in place without prior programing based on historical data.

At step 812, third sensor data is received from the sensor array and/or the door sensors associated with the second room. Like the first and second data, the third data generally includes at least TPH and in some cases door sensor data. However, unlike the first and second data, in some embodiments, the third data includes TPH and door sensor data for only the second (i.e., adjacent) room, in cases where the first room is the "target room" for predicting future TPH. In some embodiments, data may also be received for the first room when predicting TPH for the second room. In some embodiments, the third data may also include a schedule for the second room that indicates future (e.g., pre-programmed) TPH values for the second room. For example, the second room may be programmed to change the TPH at a future time interval. As contemplated above, a change to the TPH of the second room, even in the future, may affect the TPH of the first room. Accordingly, the third data may indicate the future TPH values, if known.

At step 814, the predictive model is executed to predict TPH for the first room based on the third data received at step 812. As mentioned above, for example, the predictive model may be trained to identify a relationship between the first and second rooms. In other words, the predictive model is executed to predict future TPH values for the first (i.e., target) room based on the third data corresponding to the TPH of the second room and/or the door sensor data. In some embodiments, output of the predictive model is TPH values for one or more time steps of a time horizon. For example, for one or more time steps, the predictive model may indicate a magnitude and direction of a change in TPH values for the first room based on the second room. In a more specific example, the predictive model may indicate that the temperature of the first room is expected to increase at a rate of X° F./minute, or that the humidity of the first room is expected to drop by a specific percentage. In other embodiments, the predictive model may indicate particular TPH values for each of the future time steps.

At step 816, compliance issues are identified based on the predicted TPH for the first room. More specifically, the predicted future TPH values for the first room may be compared to a compliance standard (e.g., received from a compliance entity such as TJC or CMS). The comparison may indicate whether one or more of the TPH values for the first room are predicted to exceed a threshold as indicated by the compliance standard. For example, the compliance standard may indicate that a particular type of room (e.g., an operation room), corresponding to the type of the first room, should maintain between 40-60% humidity. Accordingly, if the predictive model indicates that the humidity of the first room is expected to exceed either the upper or lower limit of the range at any point over the time horizon, a compliance issue may be predicted.

At step 818, building devices (e.g., HVAC equipment) are automatically controlled to affect the TPH of the first and/or the second room. The building devices may be controlled to in order to maintain the TPH of the first and/or second room within the compliance standards. In this regard, if one of the TPH values for the first or second rooms is predicted to become non-compliant in the future, the building devices may be controlled to counter the predicted non-compliance. For example, one of the TPH for the first or second room could be increased or decreased to compensate for detected or predicted compliance issues.

As an example, the third data may indicate that the second room (e.g., an operating room) will be in use for a period of time two hours from a current time. When in use, the TPH of the second room may be adjusted according to the preferences of a surgeon, for example. The predictive model may generate a prediction that the TPH of the first room will change accordingly. Based on this prediction, HVAC equipment that serves the first room may be controlled to compensate for the predicted TPH change. For example, specific setpoints may be set for the future time period, or the equipment may be operated to adjust the TPH of the first room in advance, such as to prevent drastic TPH fluctuations when the second room is in use.

Referring now to FIGS. 9A and 9B, various processes for calibrating a sensor array are shown, according to some embodiments. More specifically, FIGS. 9A and 9B illustrate two different processes for calibrating a sensor array for use with a controller, such as controller 600 described above. Both of the processes described below provide intuitive and easy-to-implement calibration procedures that can be initiated by a wide range of users at regular intervals. These processes are easy to follow and do not require significant experience by the technician or downtime for the system. Certain steps of either of these processes can be implemented by the controller 600, in some cases, although some steps of either process may be implemented manually (e.g., by a user). It will be appreciated that certain steps of the process described below may be optional and, in some embodiments, the processes may be implemented using less than all of the steps.

As described briefly above, sensors within a room or space (e.g., the sensor arrays 632) may be regularly calibrated to ensure accurate and precise measurements. TPH measurements, in particular, may need to be accurate to within a threshold set by a compliance governing body, for example. Accordingly, the sensors or sensor arrays may be calibrated to ensure accuracy at regular intervals (e.g., every six months, every year, etc.). In some embodiments, a particular calibration schedule may be set by a manufacturer of a sensor or sensor array. In other embodiments, the compliance governing body (e.g., TJC, CMS) may determine the calibration schedule.

Turning first to FIG. 9A, a process 900 for calibrating a sensor array utilizing a calibration unit is shown. At step 902, the calibration unit is placed in an area of a building and initialized. The calibration unit (e.g., calibration unit 730) is generally a sensor array, similar to one of the sensor arrays 632 or 710-716, configured to measure TPH within an area.

In this regard, the calibration unit can include at least a temperature, a pressure, and a humidity sensor. The calibration unit may be received directly from a manufacturer or a calibration specialist having been previously calibrated itself. Accordingly, the calibration unit is known to provide highly accurate TPH measurements prior to use. The calibration unit may be placed in a target room or array by a user. Initializing the calibration unit may be as simple as turning the calibration unit on or connecting the calibration unit to a power source.

At step 904, the calibration unit is communicably coupled to a climate control system associated with the room. In some embodiments, the calibration unit is wirelessly coupled to the climate control system, and in other embodiments the calibration is coupled via a wired connection. The climate control system may be a controller, such as the controller 600, or an entire BMS such as the BMS 400 or the BMS 500. In any case the climate control system is generally configured to affect the TPH within the room containing the calibration unit. Coupling the calibration unit to the climate control system allows the climate control system to receive sensor data relating to TPH measurements for the room.

At step 906, sensor data is transmitted to the climate control system by the calibration unit. As mentioned, the sensor data can include at least TPH measurements for the room. The climate control system may receive the sensor data and, at step 908, can compare the received sensor data to additional sensor data received from a sensor array within the room. In this regard, at step 906, the climate control system may also receive or retrieve data from a sensor array positioned within the same room as the calibration unit. The sensor data from the sensor array and the sensor data from the calibration unit may be compared to determine an offset between the two sets of data. For example, the comparison may indicate that the sensor array data is a percentage higher or lower that the calibration unit data, or may otherwise indicate how close the sensor array data matches the calibration unit.

At step 910, the sensor array associated with the room is calibrated based on the comparison. In some embodiments, calibrating the sensor array may include adjusting one or more parameters of a sensor or sensors within the sensor array. In some embodiments, calibrating the sensor array may include weighting or adjusting the sensor array data after it is received by the climate control system. For example, if the sensor data is determined to be 5% less than the data received from the calibration unit, then the sensor data values may be increased by 5% to compensate.

In other embodiments, the sensor array is flagged for repair or replacement. For example, if the sensor array data and calibration unit data are determined to be off by more than a threshold amount, the sensor array may be deemed faulty. Accordingly, the climate control system (e.g., controller 600) may generate an alert (i.e., a notification) that indicates the faulty sensor array and requests repair or replacement. The notification may be transmitted to a user device associated with a system manager, a maintenance technician, etc. In some cases, maintenance may also be automatically scheduled if a faulty sensor array is detected. In some embodiments, information regarding the calibration of the sensor array and/or an indication of a faulty sensor array may also be transmitted to a user device (e.g., user device 636), for display via a user interface of the user device.

FIG. 9B shows a process 920 for calibrating a sensor array by replacing a sensor array currently installed in an area with a new, calibrated sensor array. Process 920 may be an alternative calibration method implemented in place of, or in addition to, process 900. At step 922, a calibrated sensor array is received. Like the calibration unit described above with respect to process 900, the calibrated sensor array is generally similar to one of the sensor arrays 632 or 710-716, and is configured to measure TPH within an area. In this regard, the calibrated sensor array can include at least a temperature, a pressure, and a humidity sensor. The calibrated sensor array may be received directly from a manufacturer or a calibration specialist having been previously calibrated prior to shipping. Accordingly, the calibrated sensor array is known to provide highly accurate TPH measurements prior to use.

At step 924, a sensor array currently installed in an area of a building (e.g., a room) is replaced with the calibrated sensor array. In other words, the currently installed sensor array may be removed and the calibrated sensor array may be installed in its place. This may include dismounting the original sensor array from within the area or room it is located in, and disconnecting the original sensor array from a climate control system (e.g., the controller 600). Disconnecting the original sensor array may include wirelessly disconnecting the unit or physically unplugging the unit from the system. Subsequently, the calibrated sensor array may be mounted and connected to the system, such as by wirelessly connecting the calibrated sensor array or by plugging the calibrated sensor array into a hardwired connection.

At step 926, a climate control system for the area is automatically coupled (i.e., configured) to the calibrated sensor array and configured to receive data from the calibrated sensor array. In other words, the calibrated sensor array is automatically configured to interact with the climate control system, such as by sending and receiving data. In this regard, automatically coupling or configuring the calibrated sensor array can include installing updated drivers for the sensors of the calibrated sensor array, adjusting system parameter, etc. More generally, the calibrated sensor array is automatically configured to exchange data with the system in the same manner as the previously installed (e.g., original) sensor array. In this regard, process 920 provides a simple plug-and-play method of calibrating the climate control system.

CONFIGURATIONS OF EXEMPLARY EMBODIMENTS

The construction and arrangement of the systems and methods as shown in the exemplary embodiments are illustrative only. Although only a few embodiments have been described in detail in this disclosure, many modifications are possible (e.g., variations in sizes, dimensions, structures, shapes and proportions of the elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the connection steps, processing steps, comparison steps and decision steps.

What is claimed is:

1. A building management system (BMS) for monitoring and controlling heating, ventilation, or air conditioning (HVAC) parameters in a building, the BMS comprising:
    one or more processing circuits comprising one or more memory devices coupled to one or more processors, the one or more memory devices configured to store instructions thereon that, when executed by the one or more processors, cause the one or more processors to:
    initialize one or more predictive models for predicting temperature and pressure within a target area and an adjacent area of the building,
    receive target area data from a target area sensor configured to measure temperature and/or pressure of the target area,
    receive adjacent area data from an adjacent area sensor configured to measure temperature and/or pressure of the adjacent area,
    execute the one or more predictive models, based on the adjacent area data, to generate a prediction of future temperature and pressure within the adjacent area,
    execute the one or more predictive models, based on the target area data and the prediction of future temperature and pressure within the adjacent area, to generate a prediction of future temperature and pressure within the target area, and
    control operation of HVAC equipment, based on the prediction of future temperature and pressure within the target area, to maintain the temperature and/or pressure of the target area within a compliance standard.

2. The BMS of claim 1, wherein the one or more memory devices are further configured to store instructions thereon that, when executed by the one or more processors, cause the one or more processors to:
    receive updated target area data from the target area sensor,
    receive updated adjacent area data from the adjacent area sensor, and
    prior to executing the one or more predictive models, update the one or more predictive models based on the updated target area data and the updated adjacent area data.

3. The BMS of claim 1, wherein the one or more memory devices are further configured to store instructions thereon that, when executed by the one or more processors, cause the one or more processors to:
    train the one or more predictive models using historical data including at least temperature and pressure for the target area and the adjacent area.

4. The BMS of claim 1, wherein the one or more memory devices are further configured to store instructions thereon that, when executed by the one or more processors, cause the one or more processors to:
    identify compliance issues by comparing the predicted future temperature and/or pressure of the target area with the compliance standard.

5. The BMS of claim 4, wherein the one or more memory devices are further configured to store instructions thereon that, when executed by the one or more processors, cause the one or more processors to:
    generate a notification in response to identifying compliance issues, the notification indicating one of the predicted future temperature and/or pressure of the target area that is non-compliant, and
    transmit the notification to a user device.

6. The BMS of claim 1, wherein the one or more memory devices are further configured to store instructions thereon that, when executed by the one or more processors, cause the one or more processors to:
    receive access control data from a door sensor associated with the target area or the adjacent area, wherein the one or more predictive models are executed based on the access control data in addition to the target area data and the adjacent area data.

7. The BMS of claim 1, wherein at least one of the target area sensor or the adjacent area sensor are calibrated by comparing the target area data or the adjacent area data with corresponding sensor data from a calibration unit.

8. A building management system (BMS) for monitoring and controlling heating, ventilation, or air conditioning (HVAC) parameters in a building, the BMS comprising:
    one or more processing circuits comprising one or more memory devices coupled to one or more processors, the one or more memory devices configured to store instructions thereon that, when executed by the one or more processors, cause the one or more processors to:
    receive door sensor data for a space within the building, the door sensor data indicating a position of one or more doors located in the space,
    receive temperature and/or pressure data from a sensor positioned within an adjacent space, execute one or more predictive models using the temperature and/or pressure data to generate a prediction of future temperature and/or pressure within the adjacent space, execute the one or more predictive models, using the door sensor data and the prediction of future temperature and/or pressure within the adjacent space, data to predict future temperature and pressure data for the space, and control operation of HVAC equipment associated with the space based on the predicted future temperature and pressure data for the space.

9. The BMS of claim 8, wherein the one or more memory devices are further configured to store instructions thereon that, when executed by the one or more processors, cause the one or more processors to:

receive updated temperature and/or pressure from the sensor, received updated door sensor data, and prior to executing the one or more predictive models, update the one or more predictive models based on at least one of the updated temperature and pressure data or the updated door sensor data.

10. The BMS of claim 8, wherein the one or more memory devices are further configured to store instructions thereon that, when executed by the one or more processors, cause the one or more processors to:

train the one or more predictive models using at least one of historical temperature and/or pressure data or historical door sensor data for the space.

11. The BMS of claim 8, wherein the one or more memory devices are further configured to store instructions thereon that, when executed by the one or more processors, cause the one or more processors to:

identify compliance issues by comparing the predicted future temperature and pressure with a compliance standard.

12. The BMS of claim 11, wherein the one or more memory devices are further configured to store instructions thereon that, when executed by the one or more processors, cause the one or more processors to:

generate a notification in response to identifying compliance issues, the notification indicating one of the predicted future temperature and/or pressure of the space that is non-compliant, and transmit the notification to a user device.

13. The BMS of claim 8, wherein the sensor is calibrated by comparing the received temperature, and/or pressure data with corresponding sensor data from a calibration unit.

14. The BMS of claim 8, wherein the sensor is removably coupled to the BMS such that the sensor can be removed and replaced with a calibrated sensor.

* * * * *